(12) United States Patent
Tomita et al.

(10) Patent No.: US 6,872,002 B2
(45) Date of Patent: Mar. 29, 2005

(54) BEARING MATERIAL FOR POROUS HYDROSTATIC GAS BEARING AND POROUS HYDROSTATIC GAS BEARING USING THE SAME

(75) Inventors: Hirotsugu Tomita, Fujisawa (JP); Naofumi Kumagai, Fujisawa (JP)

(73) Assignee: Oiles Corporation, Tokyo (JP)

( * ) Notice: Subject to any disclaimer, the term of this patent is extended or adjusted under 35 U.S.C. 154(b) by 28 days.

(21) Appl. No.: 10/645,842

(22) Filed: Aug. 22, 2003

(65) Prior Publication Data

US 2004/0071374 A1 Apr. 15, 2004

(30) Foreign Application Priority Data

Aug. 28, 2002 (JP) .......................................... 2002-248477
Feb. 19, 2003 (JP) .......................................... 2003-041558

(51) Int. Cl.[7] ............................................. F16C 32/06
(52) U.S. Cl. .......................... 384/12; 384/114; 384/279; 384/907; 384/913; 508/100

(58) Field of Search ............................. 384/12, 42, 120, 384/114, 107, 279, 907, 913; 508/100

(56) References Cited

U.S. PATENT DOCUMENTS 4,505,987 A  3/1985  Yamada et al.
6,342,306 B1  1/2002  Ozawa et al.

FOREIGN PATENT DOCUMENTS

JP  11-158511  6/1999

*Primary Examiner*—Lenard A Footland
(74) *Attorney, Agent, or Firm*—Nixon & Vanderhye P.C.

(57) ABSTRACT

A bearing material includes: a backing metal made of stainless steel; and a porous sintered metal layer integrated with at least one surface of the backing metal by means of a bonding layer, particles of an inorganic substance being contained in a dispersed manner at grain boundaries of the porous sintered metal layer, wherein the porous sintered metal layer containing the particles of the inorganic substance are composed of 4 to 10% by weight of tin, 10 to 40% by weight of nickel, not less than 0.1 and less than 0.5% by weight of phosphorus, and the balance consisting of copper.

30 Claims, 8 Drawing Sheets

BEARING MATERIAL FOR POROUS HYDROSTATIC GAS BEARING AND POROUS HYDROSTATIC GAS BEARING USING THE SAME

BACKGROUND OF THE INVENTION

1. Field of the Invention

The present invention relates to a bearing material for a hydrostatic gas bearing having a porous sintered metal layer and a hydrostatic gas bearing using this bearing material.

2. Description of the Related Art

Porous hydrostatic gas bearings have hitherto attracted attention as having excellent high-speed stability and high load carrying capacity, and although various studies have been made, there are yet a number of problems to be overcome in their practical use.

As for the porous hydrostatic gas bearing, a bearing material which is formed by combining a porous sintered metal compact with a backing metal provided with means for supplying a compressed gas is frequently used. As the material for forming the porous sintered metal compact in this bearing material, a material which mainly consists of bronze, an aluminum alloy, or stainless steel, particularly a material which mainly consists of bronze, is frequently used.

As the bearing material used for the porous hydrostatic gas bearing, sufficient gas permeability and the surface roughness on the order of $10^{-3}$ mm are required. However, in the case where the above-described bearing material is used for the hydrostatic gas bearing, the porous sintered metal compact itself has satisfactory gas permeability in a way, but since the dimensional accuracy and surface roughness of the porous sintered metal compact are not sufficient, its surface is subjected to machining in many cases.

This machining is mainly effected by lathe turning, milling, and/or grinding, but loading of the surface of the porous sintered metal compact is caused by such lathe turning, milling, and/or grinding, which substantially affects its gas permeability (drawing characteristic). In grinding, in particular, plastic flow takes place in the surface of the porous sintered metal compact, and burrs are consequently caused.

In addition, the porous sintered metal compact is combined with the backing metal provided with the means for supplying a compressed gas as described above, and in the case of, for example, a porous hydrostatic radial gas bearing, a means for press-fitting a hollow cylindrical porous sintered metal compact to a hollow cylindrical backing metal is adopted in this combining process.

In the case of a simple slide bearing, no particular problem occurs even if such a press-fitting means is adopted. In the porous hydrostatic gas bearing, however, since a very small gap is present between the contact portions of the two members which are apparently tightly press-fitted to each other, there are cases where the leakage of the gas from this gap is greater than the essential circulation of the compressed gas in the porous sintered metal compact. The leakage of the gas from this gap naturally leads to a decline in the performance such as a reduction of the load capacity as the porous hydrostatic gas bearing, so that it is preferable to prevent this leakage as much as possible.

To cope with this problem, if the interference is made large and fitting is effected with a large press-fitting force, the gap in this portion can be eliminated substantially completely. On the other hand, however, there is the possibility of occurrence of plastic flow of the sintered metal on the outer surface side of the porous sintered metal compact subjected to extremely large drawing by the backing metal. Hence, a problem newly arises in that, after fitting to the backing metal, the circulation of the compressed gas is substantially hampered on the fitted surface side of the porous sintered metal compact.

In view of the above-described problems, the present assignee proposed a technique such as the one disclosed in JP-A-11-158511 (hereafter referred to as the conventional technique) to overcome the above-described problems. Namely, this conventional technique concerns a bearing material for a porous hydrostatic gas bearing includes: a backing metal; and a porous sintered metal layer sintered onto at least one surface of the backing metal, particles of an inorganic substance being contained at grain boundaries of the porous sintered metal layer. As a specific example, this conventional technique further discloses a porous sintered metal layer which is composed of, in addition to the particles of the inorganic substance, 4 to 10% tin, 10 to 40% nickel, 0.5 to 4% phosphorus, 3 to 10% graphite by weight, and the balance consisting of copper.

The bearing material disclosed in this conventional technique offers the following advantages: (1) Since particles of an inorganic substance such as graphite are contained at grain boundaries of the porous sintered metal layer, even if the bearing material is subjected to machining, the loading of its surface is suppressed, and an ideal drawn structure can be obtained. (2) Since the porous sintered metal layer is integrated with the backing metal by bonding, the leakage of a compressed gas from this junction is nil, and the deformation of the sintered layer due to the supplied gas pressure can be reduced to a minimum.

As for the porous sintered metal layer of the bearing material disclosed in this conventional technique, nickel (Ni) and phosphorus (P) among the components produce liquid-phase $Ni_3P$ in the sintering process, and the alloying of the sintered layer takes place by the mutual diffusion between the solid phase and the liquid phase, which becomes gradually active with a rise in the sintering temperature. In addition, the bearing material is fabricated through integration by bonding between the porous sintered metal layer and the backing metal with excellent wettability of the liquid-phase $Ni_3P$ with respect to the backing metal (steel product).

However, in a case where stainless steel excelling in corrosion resistance, particularly rust resistance, is used as the backing metal, a number of problems were presented in the bonding and integration of the backing metal and the porous sintered metal layer. Namely, these problems include: (1) In a case where the porous sintered metal layer is bonded to at least one surface of the backing metal consisting of stainless steel at the time of sintering, chromium oxides such as $Cr_2O_3$ are formed on the surface of the backing metal, i.e., at the bonded interface between the backing metal and the porous sintered metal layer. Since the chromium oxides are interposed at the bonded interface, the bonding and integration of the porous sintered metal layer onto the backing metal surface is hampered. (2) If the amount of liquid-phase $Ni_3P$ produced during sintering is large, such liquid-phase $Ni_3P$ flows out during sintering, and the liquid-phase amount of $Ni_3P$ necessary for bonding the porous sintered metal layer to the backing metal surface decreases, thereby weakening the bonding strength between the porous sintered metal layer and the backing metal. Thus the porous sintered metal layer shrinks at the junction between the porous sintered metal layer and the backing metal along with a decline in the temperature during cooling (radiational cooling) after sintering, resulting in an exfoliation at the junction. In particular, the above-described problem (2) brings about drawbacks such as the leakage of a compressed gas from the junction in the porous hydrostatic gas bearing.

As a result of conducting research in view of the above-described problems, the present inventors discovered that, with respect to the above-described problem (1), if a plating layer is provided on the surface of the backing metal consisting of stainless steel, and the bonding layer consisting of such a plating layer is interposed between the backing metal and the porous sintered metal layer, it is possible to prevent the formation of chromium oxides at the bonded interface between the backing metal and the porous sintered metal layer, and the porous sintered metal layer can be bonded to and integrated with the surface of the backing metal consisting of stainless steel by means of the bonding layer. In addition, the present inventors discovered that, with respect to the above-described problem (2), the amount of shrinkage of the porous sintered metal layer during cooling after sintering can be reduced by decreasing the amount of liquid-phase $Ni_3P$ produced, and that it is therefore possible to effect the bonding and integration without causing exfoliation at the junction between the porous sintered metal layer and the backing metal, and enhance the porosity of the porous sintered metal layer to increase the amount of flotation by the compressed gas circulating through the porous sintered metal layer.

SUMMARY OF THE INVENTION

The present invention has been devised on the basis of the above-described knowledge, and its object is to provide a bearing material for a porous hydrostatic gas bearing which makes it possible to effect firm bonding and integration without causing exfoliation or the like between the porous sintered metal layer and the backing metal consisting of stainless steel, and enhance the porosity of the porous sintered metal layer to increase the amount of flotation by the compressed gas circulating through the porous sintered metal layer, as well as a porous hydrostatic gas bearing using the same.

In addition, in such a bearing material for a porous hydrostatic gas bearing, its backing metal is provided with supplying means for supplying a compressed gas to the porous sintered metal layer. This supplying means should preferably be arranged to cause the compressed gas to spout uniformly from all over the surface of the porous sintered metal layer. Moreover, particularly in the case of the backing metal used as a bearing material for a porous hydrostatic gas radial bearing and provided with such a means for supplying a compressed gas on its hollow cylindrical inner surface, it is required that such a backing metal can be easily formed and excels in the manufacturing efficiency.

Another object of the invention is to provide a bearing material for a porous hydrostatic gas radial bearing which makes it possible to minimize unevenness in the spouting of a compressed gas from the surface of the porous sintered metal layer and excels in the manufacturing efficiency, as well as a porous hydrostatic gas radial bearing using the same.

In accordance with a first aspect of the invention, there is provided a bearing material for a porous hydrostatic gas bearing comprising: a backing metal made of stainless steel; and a porous sintered metal layer integrated with at least one surface of the backing metal by means of a bonding layer, particles of an inorganic substance being contained in a dispersed manner at grain boundaries of the porous sintered metal layer, the porous sintered metal layer which contains the particles of the inorganic substance being composed of 4 to 10% by weight of tin, 10 to 40% by weight of nickel, not less than 0.1 and less than 0.5% by weight of phosphorus, and the balance consisting of copper.

According to the bearing material for a porous hydrostatic gas bearing in accordance with the first aspect, since the content of the phosphorus component for producing liquid-phase $Ni_3P$ in the sintering process is not less than 0.1 and less than 0.5% by weight, the amount of liquid-phase $Ni_3P$ produced is small, and the liquid-phase $Ni_3P$ does not flow out during sintering. Hence, an amount of liquid-phase $Ni_3P$ necessary for bonding the porous sintered metal layer to the bonding layer is obtained. The bonding strength between the porous sintered metal layer and the backing metal by means of the bonding layer is enhanced. Moreover, since the amount of liquid-phase $Ni_3P$ produced is small, the amount of shrinkage of the porous sintered metal layer during cooling (radiational cooling) after sintering is small. Hence, exfoliation of the porous sintered metal layer does not occur at junctions of the backing metal, the porous sintered metal layer, and the bonding layer due to the shrinkage of the porous sintered metal layer.

In addition, since the amount of liquid-phase $Ni_3P$ is small and the bonding layer is interposed, the porosity of the porous sintered metal layer integrated with the backing metal is enhanced. Consequently, pressure loss in the compressed gas circulating through the porous sintered metal layer declines, and the supply pressure of the gas spouting through the surface (bearing surface) of the porous sintered metal layer relatively increases, making it possible to increase the amount of flotation. Accordingly, it is possible to obtain a bearing material for a porous hydrostatic gas bearing in which the porous sintered metal layer and the backing metal are firmly integrated by means of the bonding layer, and which makes it possible to increase the amount of flotation due to the enhanced porosity of the porous sintered metal layer.

According to the bearing material for a porous hydrostatic gas bearing in accordance with a second aspect of the invention, in the bearing material in accordance with the first aspect, the particles of the inorganic substance are contained in the porous sintered metal layer at a rate of 2 to 10% by weight. As with the bearing material in accordance with a third aspect of the invention, the particles of the inorganic substance are those of at least one of graphite, boron nitride, graphite fluoride, calcium fluoride, aluminum oxide, silicon oxide, and silicon carbide.

The particles themselves of an inorganic substance contained in a dispersed manner at grain boundaries of the porous sintered metal layer do not undergo plastic deformation in machining. Additionally, by virtue of their function to disrupt and alleviate the plastic deformation of metal portions in the substrate of the porous sintered metal layer, it is possible to suppress the loading of the porous sintered metal layer in machining.

As with the bearing material in accordance with a fourth aspect of the invention, the backing metal may be formed into a hollow cylindrical shape. Alternatively, the backing metal may be formed into a planar shape as with the bearing material in accordance with a fifth aspect of the invention. In the former case, the porous sintered metal layer containing the particles of the inorganic substance is integrated on one cylindrical surface of the backing metal by means of the bonding layer. In the latter case, the porous sintered metal layer containing the particles of the inorganic substance is integrated on one planar surface of the backing metal by means of the bonding layer.

As with the bearing material in accordance with a sixth aspect of the invention, the bonding layer may include at least a nickel plated layer, or may be comprised of two plated layers including a nickel plated layer and a copper plated layer as with the bearing material in accordance with a seventh aspect of the invention. In either case, the nickel plated layer is sufficient if it is bonded to at least the one surface of the backing metal. In the case where the bonding layer is comprised of two plated layers including the nickel plated layer and the copper plated layer, the porous sintered metal layer is sufficient if it is bonded to the copper plated layer. The nickel plated layer and the copper plated layer are respectively formed by electroplating.

If, as with the bearing material in accordance with the sixth aspect of the invention, the bonding layer including the nickel plate layer is formed on the surface of the backing metal made of stainless steel, and the nickel plated layer is bonded to at least the one surface of the backing metal, firm bonding and integration takes place between the two members. In addition, firm bonding and integration similarly takes place between the two members if, as with the bearing material in accordance with the seventh aspect of the invention, the bonding layer formed on the surface of the backing metal is comprised of two plated layers including the nickel plated layer and the copper plated layer, the nickel plated layer being bonded to at least the one surface of the backing metal, the porous sintered metal layer being bonded to the copper plated layer. Accordingly, in either case, exfoliation or the like do not occur at junctions of the backing metal made of stainless steel, the porous sintered metal layer, and the bonding layer. Further, if the copper plated layer in the bearing material in the seventh aspect is formed on an obverse surface of the nickel plated layer as with the bearing material in accordance with an eighth aspect of the invention, firm bonding and integration of the two plated layers can be obtained, and it is possible to ensure firm integration between the backing metal and the porous sintered metal layer as described above.

Preferably, the copper plated layer has a thickness of not less than 10 µm and not more than 25 µm as with the bearing material in accordance with a ninth aspect of the invention. More preferably, the copper plated layer has a thickness of not less than 10 µm and not more than 20 µm as with the bearing material in accordance with a 10th aspect of the invention. Preferably, the nickel plated layer has a thickness of not less than 2 µm and not more than 20 µm as with the bearing material in accordance with an 11th aspect of the invention. More preferably, the nickel plated layer has a thickness of not less than 3 µm and not more than 15 µm as with the bearing material in accordance with a 12th aspect of the invention.

The porous hydrostatic gas bearing in accordance with the invention uses the bearing material for a porous hydrostatic gas bearing in accordance with any one of the first to 12th aspects, and comprises means for supplying a compressed gas to the porous sintered metal layer containing the particles of the inorganic substance in a dispersed manner, the supplying means being provided in the backing metal.

According to the porous hydrostatic gas bearing in accordance with the invention, the porous hydrostatic gas bearing can be applied to a porous hydrostatic gas radial bearing by using the bearing material in accordance with the fourth aspect, or can be applied to a porous hydrostatic gas thrust bearing by using the bearing material in accordance with the fifth aspect.

A bearing material for a porous hydrostatic gas radial bearing in accordance with a first aspect of the invention comprises: a backing metal made of stainless steel and having a cylindrical inner surface; a plurality of annular groove portions which are provided in the inner surface of the backing metal in such a manner as to be juxtaposed in an axial direction and to be open on an inner surface side; a dead-end hole portion for mutual communication provided inside the backing metal in such a manner as to extend in an axial direction of the backing metal from one annular end face of the backing metal toward another annular end face thereof, to allow the annular grooves to communicate with each other; and a hollow cylindrical porous sintered metal layer for covering openings of each of the annular groove portions on the inner surface side of the backing metal, and integrated with the cylindrical inner surface of the backing metal by means of a bonding layer.

According to the bearing material for a porous hydrostatic gas radial bearing in accordance with the first aspect, since the dead-end hole portion for mutual communication for allowing the annular groove portions to communicate with each other is provided inside the backing metal so as not to be open on the inner surface side of the backing metal, it is possible to avoid the supply of the compressed gas directly from the dead-end hole portion to the porous sintered metal layer through the inner surface of the backing metal. Thus the compressed gas supplied to this dead-end hole portion for mutual communication can be supplied to the porous sintered metal layer through the respective annular groove portions. Consequently, the compressed gas can be made to spout substantially uniformly from the surface of the porous sintered metal layer. Moreover, since the dead-end hole portion for mutual communication is provided inside the backing metal, such a dead-end hole portion can be easily formed in the one end face of the backing metal by using a drill or the like, so that the fabrication efficiency extremely excels in comparison with the formation of the groove portion for mutual communication in the cylindrical inner surface.

Both ends of the dead-end hole portion for mutual communication may be open at corresponding annular end faces. Preferably, as with the bearing material for a porous hydrostatic gas radial bearing in accordance with a second aspect, one end of the dead-end hole portion for mutual communication is open at an annular end face of the backing metal, and another end of the dead-end hole portion for mutual communication is closed by the backing metal itself short of another annular end face of the backing metal. In this case, the bearing material for a porous hydrostatic gas radial bearing may further comprise fitting means for fitting a plug for closing the one end of the dead-end hole portion for mutual communication, as in a third aspect of the invention. As with the bearing material for a porous hydrostatic gas radial bearing in accordance with a fourth aspect, the fitting means may have a thread groove. In the case where both ends of the dead-end hole portion for mutual communication are open, the bearing material in accordance with the invention may comprise fitting means constituted by thread grooves or the like for fitting plugs for closing these both ends.

In the present invention, the dead-end hole portion for mutual communication may be used as a dead-end hole portion for supplying a compressed gas. However, preferably, as in accordance with a fifth aspect, the bearing material for a porous hydrostatic gas radial bearing in accordance with the invention further comprises a dead-end hole portion for supplying a compressed gas provided inside the backing metal in such a manner as to be open at an outer surface of the backing metal and extending radially from the outer surface of the backing metal toward the dead-end hole portion for mutual communication.

In the same way as the bearing material for a porous hydrostatic gas bearing, as in a sixth aspect, in the bearing material for a porous hydrostatic gas radial bearing in accordance with the invention, the porous sintered metal layer includes grain boundaries of a sintered metal containing tin, nickel, phosphorus, and copper, and particles of an inorganic substance dispersed at the grain boundaries of the sintered metal. In this case, as with the bearing material for a porous hydrostatic gas radial bearing in accordance with a seventh aspect, 4 to 10% by weight of tin, 10 to 40% by weight of nickel, not less than 0.1 and less than 0.5% by weight of phosphorus, and the balance including copper are contained at grain boundaries of the sintered metal. As with the bearing material for a porous hydrostatic gas radial bearing in accordance with an eighth aspect, the particles of the inorganic substance are contained at a rate of 2 to 10% by weight. As with the bearing material for a porous hydrostatic gas radial bearing in accordance with a ninth aspect, the particles of the inorganic substance may be those of at least one of graphite, boron nitride, graphite fluoride, calcium fluoride, aluminum oxide, silicon oxide, and silicon carbide. In addition, in the same way as the bearing material for a porous hydrostatic gas bearing, as with the bearing material for a porous hydrostatic gas radial bearing in accordance with a 10th aspect of the invention, the bonding layer may include at least a nickel plated layer, in this case, the nickel plated layer is bonded to the cylindrical inner surface of the backing metal. As with the bearing material for a porous hydrostatic gas radial bearing in accordance with an 11th aspect, the bonding layer may be comprised of two plated layers including a nickel plated layer and a copper plated layer formed on an obverse surface of the nickel plated layer. In this case, the nickel plated layer may be bonded to the cylindrical inner surface of the backing metal, and the copper plated layer may be bonded to the nickel plated layer.

In the bearing material for a porous hydrostatic gas radial bearing in accordance with the invention, as in a 12th aspect, the copper plated layer preferably has a thickness of not less than 10 $\mu$m and not more than 25 $\mu$m. More preferably, the copper plated layer has a thickness of not less than 10 $\mu$m and not more than 20 $\mu$m as in a 13th aspect. As in a 14th aspect, the nickel plated layer preferably has a thickness of not less than 2 $\mu$m and not more than 20 $\mu$m. More preferably, the nickel plated layer has a thickness of not less than 3 $\mu$m and not more than 15 $\mu$m as in a 15th aspect.

According to the bearing material for a porous hydrostatic gas radial bearing in accordance with the sixth to 15th aspects, respectively, it is possible to obtain advantages similar to those of the above-described bearing material for a porous hydrostatic gas bearing.

Hereafter, a description will be given of the present invention and preferred embodiments of the invention with reference to the drawings. It should be noted that the present invention is not limited to these embodiments.

DESCRIPTION OF THE PREFERRED EMBODIMENTS

Figure 1:
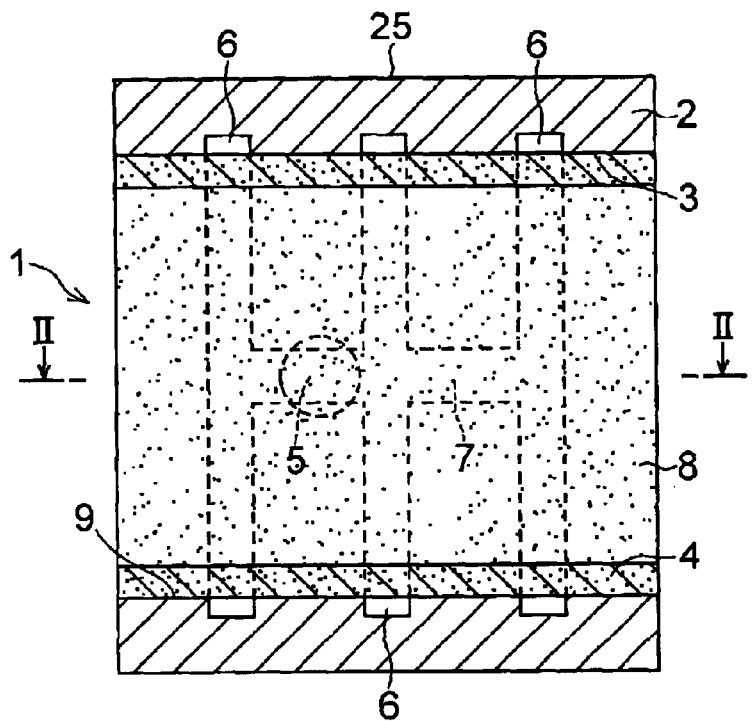
FIG. 1 is a cross-sectional view illustrating a porous hydrostatic gas radial bearing in accordance with the invention.
Figure 2:
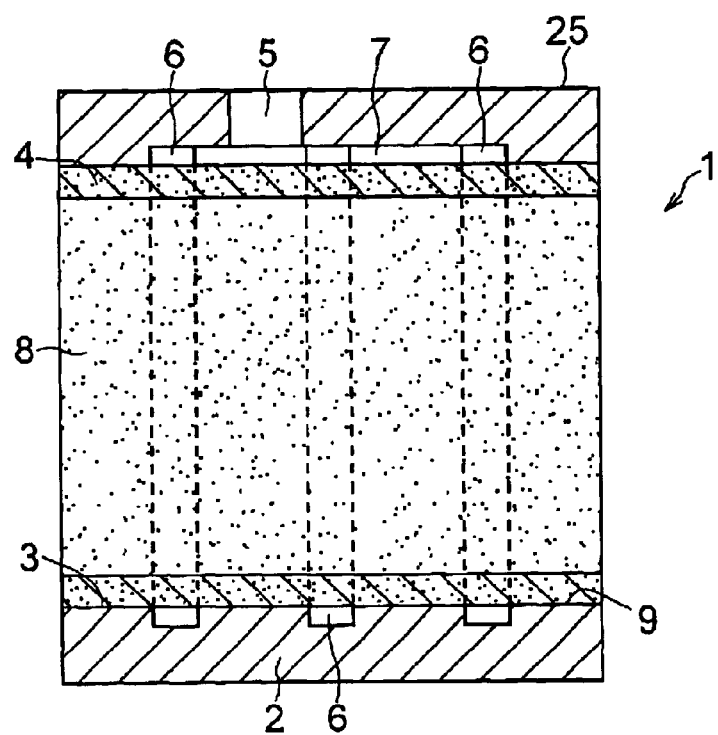
FIG. 2 is a cross-sectional view taken along line II—II shown in FIG. 1.

A porous hydrostatic gas radial bearing 1 of this embodiment shown in FIGS. 1 and 2 as a porous hydrostatic gas bearing is comprised of a backing plate 2 made of stainless steel and formed into a hollow cylindrical shape; a porous sintered metal layer 4 formed integrally on an inner surface 9, which is one cylindrical surface of the backing plate 2, by means of a bonding layer 3; a compressed-gas supplying hole 5 provided in the backing plate 2; a plurality of annular grooves 6 which are provided by being formed in the inner surface 9 of the backing plate 2 in such a manner as to be juxtaposed in the axial direction and to be open on the inner surface 9 side, the openings on the inner surface 9 side being covered by the porous sintered metal layer 4; and a groove 7 for mutual communication formed in the inner surface 9 of the backing metal 2 to be open on the inner surface 9 side and extending in the axial direction so as to allow the annular grooves 6 to communicate with each other. The cylindrical inner surface of the porous sintered metal layer 4 is formed as a bearing surface 8, and supplying means for supplying a compressed gas to the porous sintered metal layer 4 is formed by the hole 5, the annular grooves 6, and the groove 7 which are provided in the backing metal 2.

Figure 3:
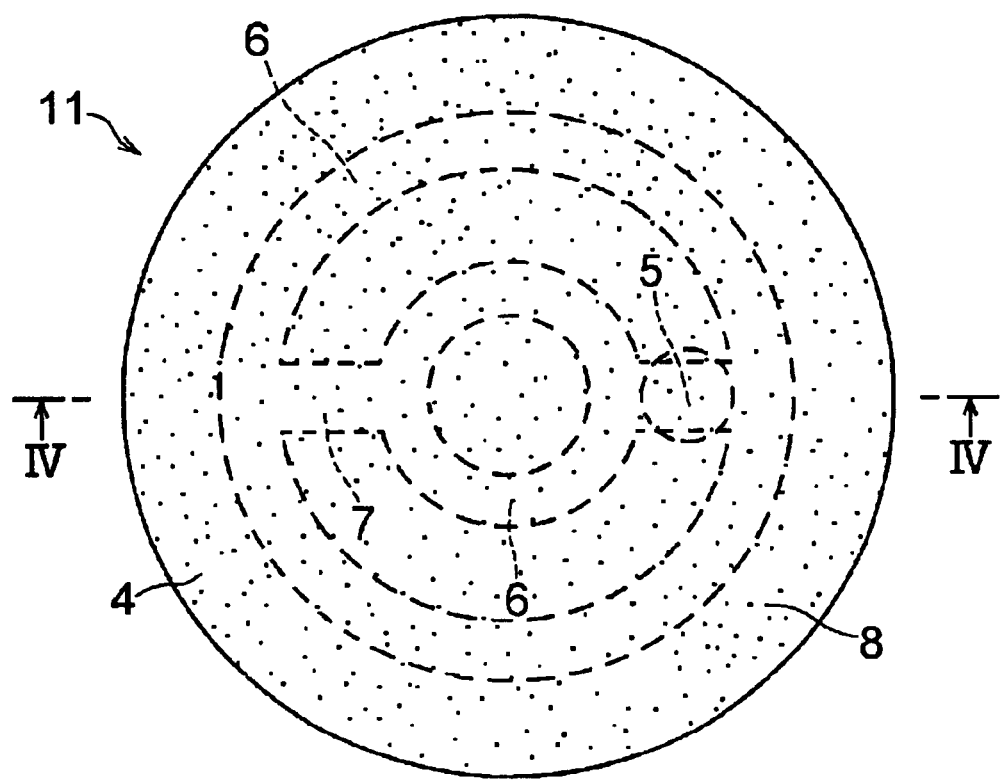
FIG. 3 is a plan view illustrating a porous hydrostatic gas thrust bearing in accordance with the invention.
Figure 4:
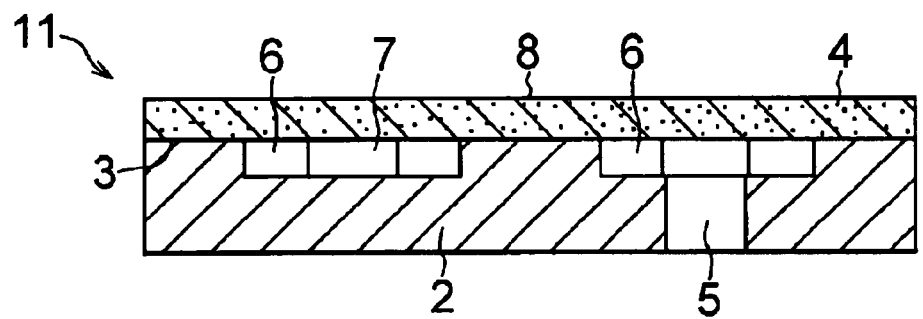
FIG. 4 is a cross-sectional view taken along line IV—IV shown in FIG. 3.

A porous hydrostatic gas thrust bearing 11 of this embodiment shown in FIGS. 3 and 4 as the porous hydrostatic gas bearing is comprised of the backing plate 2 made of stainless steel and formed into a planar shape; the porous sintered metal layer 4 formed integrally on a flat surface, which is one planar surface of the backing plate 2, by means of the bonding layer 3; the compressed-gas supplying hole 5 provided in the backing plate 2; a plurality of annular grooves 6 which are formed on the one flat surface of the backing metal 2; and the groove 7 for mutual communication formed in the one flat surface of the backing metal 2 to allow the annular grooves 6 to communicate with each other. The outer flat surface of the porous sintered metal layer 4 is formed as the bearing surface 8, and the supplying means for supplying a compressed gas to the porous sintered metal layer 4 is formed by the hole 5, the annular grooves 6, and the groove 7 which are provided in the backing metal 2.

In the porous hydrostatic gas radial bearing 1 and the porous hydrostatic gas thrust bearing 11, as the stainless steel for forming the backing metal 2, an austenitic stainless steel, a martensitic stainless steel, or a ferritic stainless steel is used. In particular, a martensitic stainless steel or a ferritic stainless steel having a small chromium (Cr) content is preferable.

The bonding layer 3 is comprised of two plated layers including a nickel plated layer bonded to the one surface of the backing metal 2 and a copper plated layer which is bonded to the obverse surface of the nickel plated layer and to the obverse surface of which the porous sintered metal layer 4 is bonded. To ensure not to cause exfoliation or the like to occur at respective junctions between the backing metal 2 and the porous sintered metal layer 4 with the bonding layer 3 interposed therebetween, the nickel plated layer has a thickness of not less than 2 $\mu$m and not more than 20 $\mu$m, preferably not less than 3 $\mu$m and not more than 15 $\mu$m, while the copper plated layer has a thickness of not less than 10 $\mu$m and not more than 25 1m, preferably not less than 10 $\mu$m and not more than 20 $\mu$m, although they depend on the degree of pressurization at the time of formation of the porous sintered metal layer 4.

The porous sintered metal layer 4 is composed of 4 to 10% by weight of tin, 10 to 40% by weight of nickel, not less than 0.1 and less than 0.5% by weight of phosphorus, 2 to 10% by weight of an inorganic substance, and the balance consisting of copper. The phosphorus component among the components forms liquid-phase $Ni_3P$ in the sintering process and functions to cause sintering to proceed, promote diffusion of the nickel component into the bonding layer 3 formed on the one surface of the backing metal 2, and firmly integrate the porous sintered metal layer 4.

In addition, by setting the compounding quantity of the phosphorus component to not less than 0.1 and less than 0.5%, the amount of shrinkage of the porous sintered metal layer 4 during cooling after sintering can be suppressed to a low level, thereby preventing the occurrence of exfoliation or the like of the porous sintered metal layer 4 from the one surface of the backing metal 2 due to the shrinkage of the porous sintered metal layer 4. Furthermore, as the compounding quantity of the phosphorus component is made small to reduce the amount of liquid-phase $Ni_3P$ formed, the porosity of the porous sintered metal layer 4 is enhanced. Since this causes a pressure loss in the compressed gas circulating through the porous sintered metal layer 4 to decline, the supply pressure of the gas spouting through the bearing surface 8 of the porous sintered metal layer 4 relatively increases, making it possible to increase the amount of flotation.

The particles of the inorganic substance contained in the porous sintered metal layer 4 in a dispersed manner are those of at least one of graphite, boron nitride, graphite fluoride, calcium fluoride, aluminum oxide, silicon oxide, and silicon carbide. These substances do not undergo plastic deformation, which is otherwise the case with many metallic materials, and they are inorganic substances.

If such particles of the inorganic substance are compounded in a dispersed manner in a substrate (grain boundary) formed of tin, nickel, phosphorus, and copper in the porous sintered metal layer 4, such inorganic substances themselves do not undergo plastic deformation in machining. Additionally, since the inorganic substances function to disrupt and alleviate the plastic deformation of metal portions in the substrate of the porous sintered metal layer 4, it is possible to suppress the loading of the porous sintered metal layer in machining.

As for the compounding quantity of these particles of the inorganic substance, the proportion of 2 to 10% by weight is appropriate. If the compounding quantity is less than 2% by weight, the inorganic substance fails to sufficiently demonstrate its function to disrupt and alleviate the plastic deformation of metal portions in the substrate of the porous sintered metal layer 4. On the other hand, if the compounding quantity is more than 10% by weight, the sinterability of the porous sintered metal layer 4 is hampered.

Next, a description will be given of the bearing material for a porous hydrostatic gas bearing and the method of manufacturing the porous hydrostatic gas bearing using this bearing material.

[Method of Manufacturing the Porous Hydrostatic Gas Thrust Bearing 11]

The disk-shaped backing metal 2 formed of an austenitic stainless steel, a martensitic stainless steel, or a ferritic stainless steel is prepared. The plurality of concentric annular grooves 6 and the groove 7 for allowing the annular grooves 6 to communicate with each other are respectively formed in one surface of this backing metal 2. Additionally, the hole 5 for supplying a compressed gas is formed which is open to the groove 7 from the other surface of the backing metal 2.

A nickel plated layer with a thickness of 2 to 20 $\mu$m, preferably 3 to 15 $\mu$m, is formed on that one flat surface of the backing metal 2 with the annular grooves 6, the groove 7, and the hole 5 formed therein which excludes the surface portions of the annular grooves 6, the groove 7, and the hole 5. A copper plated layer with a thickness of 10 to 25 $\mu$m, preferably 10 to 20 $\mu$m, is formed on the surface of the nickel plated layer. Thus two plated layers including the nickel plated layer and the copper plated layer are formed on the one flat surface of the backing metal 2 excluding the surface portions of the annular grooves 6, the groove 7, and the hole 5. These two plated layers constitute the bonding layer 3 between the backing metal 2 and the porous sintered metal layer 4.

A mixed powder is prepared by mixing in a mixer 4 to 10% by weight of an atomized tin powder passing through a 250-mesh sieve, 10 to 40t by weight of an electrolytic nickel powder passing through a 250-mesh sieve, not less than 0.7 and less than 3.4% by weight of phosphorus of a copper-phosphorus (phosphorus: 14.5%) powder passing through a 120-mesh sieve, 3 to 10% by weight of particles of an inorganic substance passing through a 150-mesh sieve, and the balance consisting of an electrolytic copper powder passing through a 150-mesh sieve.

An aqueous solution containing 1 to 15% by weight of a powder binder selected from hydroxypropyl cellulose (HPC), polyvinyl alcohol (PVA), carboxymethyl cellulose (CMC), hydroxyethyl cellulose (HEC), methylcellulose (MC), gelatin, gum arabic, and starch is added to the aforementioned mixed powder by 0.1 to 5.0% by weight, and is uniformly mixed to obtain a stock powder having wettability. Here, as the amount of the aqueous solution of the powder binder to be added, 0.1 to 5.0% by weight is preferable with respect to the metal mixed powder. In particular, if the aqueous solution of the powder binder is added in excess of 5.0% by weight, the number of pores which cannot be controlled increases in the structure of the sintered compact, and can cause a decline in the strength of the porous sintered metal layer 4. In addition, as a solvent for the powder binder, it is possible to use, in addition to water, an aqueous solution containing 5 to 20% by weight of a hydrophilic compound such as ethyl alcohol.

The stock powder having wettability is fed to a rolling mill roll by a conveyor and a hopper. In the rolling of the stock powder, it is possible to use an ordinary horizontal type rolling mill having a twin roll. A green compact sheet with a thickness of about 2 to 2.5 mm is fabricated by using this horizontal type rolling mill.

This green compact sheet is superposed on the backing metal 2 having the plated layer on its one surface excluding the surface portions of the annular grooves 6, the groove 7, and the hole 5. This assembly is sintered in a reducing atmosphere or a vacuum at a temperature of 800 to 1,150° C., preferably 850 to 1000° C., under a pressure of 0.1 to 5.0 kgf/cm$^2$, preferably 0.5 to 3.0 kgf/cm$^2$, for 20 to 120 minutes, preferably for 30 to 90 minutes.

In this sintering process, nickel (Ni) and phosphorus (P) among the components produce liquid-phase Ni$_3$P, however, since the content of the phosphorus component for producing the liquid-phase Ni$_3$P is not less than 0.1 and less than 0.5% by weight, the amount of liquid-phase Ni$_3$P produced is small, and the liquid-phase Ni$_3$P does not flow out. Hence, an amount of liquid-phase Ni$_3$P necessary for bonding the porous sintered metal layer 4 to the bonding layer 3 is obtained, and exfoliation does not occur at the junctions of the backing metal 2, the porous sintered metal layer 4, and the bonding layer 3 due to the shrinkage of the porous sintered metal layer 4 along with a decline in the temperature during cooling (radiational cooling) after sintering.

In addition, since the bonding layer 3 consisting of two plated layers of the nickel plated layer and the copper plated layer is formed on the one surface of the backing metal 2, firm integration by means of the bonding layer 3 is effected between the two members of the porous sintered metal layer 4 and the backing metal 2 in the sintering process. Further, as the amount of liquid-phase Ni$_3$P formed is reduced, the porosity of the porous sintered metal layer 4 is enhanced. Since the pressure loss in the compressed gas circulating through the porous sintered metal layer 4 thereby declines, the supply pressure of the gas spouting through the bearing surface 8 of the porous sintered metal layer 4 relatively increases, making it possible to increase the amount of flotation. Accordingly, it is possible to obtain a bearing material for the porous hydrostatic gas thrust bearing 11 in which the porous sintered metal layer 4 and the backing metal 2 are firmly integrated by means of the bonding layer 3.

Figure 5:
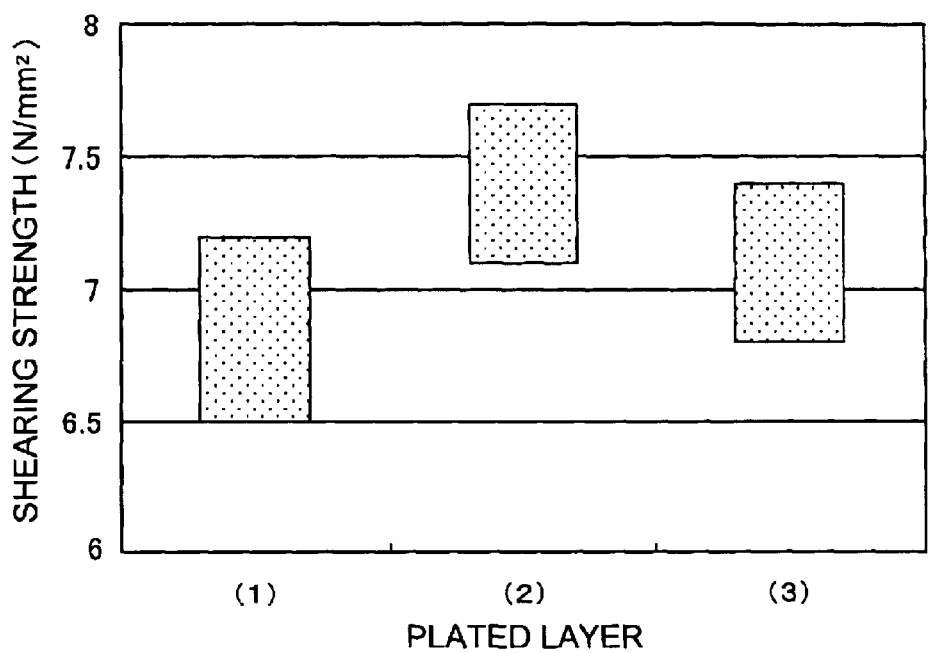
FIG. 5 is a graph illustrating the relationship between the thickness and the shearing strength of a bonding layer of the porous hydrostatic gas bearing in accordance with the invention.

FIG. 5 is a graph illustrating the bonding strength (shearing strength: N/mm$^2$) between the backing metal 2 and the porous sintered metal layer 4 with respect to the bearing material which was fabricated as follows: The green compact sheet having the above-described composition of components was superposed on the backing metal 2 on the surface of which the bonding layer 3 consisting of three kinds of layers including (1) a 3 μm-thick nickel plated layer and a 10 μm-thick copper plated layer, (2) a 3 μm-thick nickel plated layer and a 15 μm-thick copper plated layer, and (3) a 3 μm-thick nickel plated layer and a 20 μm-thick copper plated layer were formed. This assembly was sintered in a reducing atmosphere at a temperature of 930° C. under a pressure of 1.0 kgf/cm$^2$ for 85 minutes.

As can be appreciated from FIG. 5, in the plated layer (1), the bonding strength (shearing strength) between the backing metal 2 and the porous sintered metal layer 4 showed 6.5 to 7.2 N/mm$^2$; in the plated layer (2), the bonding strength (shearing strength) between the backing metal 2 and the porous sintered metal layer 4 showed 7.1 to 7.7 N/mm$^2$; and in the plated layer (3), the bonding strength (shearing strength) between the backing metal 2 and the porous sintered metal layer 4 showed 6.8 to 7.4 N/mm$^2$. Thus, in the plated layers (1) to (3), the bonding strength (shearing strength) between the backing metal 2 and the porous sintered metal layer 4 in each case showed 6.5 N/mm$^2$ or higher. Therefore, even if the flat surface of the final porous sintered metal layer 4 is subjected to machining such as grinding or lapping, exfoliation or the like does not occur between the backing metal 2 and the porous sintered metal layer 4.

Thus a thrust bearing material is obtained which has the porous sintered metal layer 4 sintered onto one surface of the disk-shaped backing metal 2 by means of the bonding layer 3. The flat surface of the porous sintered metal layer 4 of the bearing material obtained is subjected to machining such as grinding or lapping such that its roughness becomes 10$^{-3}$ mm or less, thereby obtaining a desired porous hydrostatic gas thrust bearing 11 having the bearing surface 8.

[Method of Manufacturing the Porous Hydrostatic Gas Radial Bearing 1]

The disk-shaped backing metal 2 formed of an austenitic stainless steel, a martensitic stainless steel, or a ferritic stainless steel is prepared. The plurality of annular grooves 6 arranged at equal intervals along the axial direction, as well as the groove 7 for allowing the annular grooves 6 to communicate with each other and extending along the axial direction, are respectively formed in the inner surface 9 of this backing metal 2. Additionally, the hole 5 for supplying a compressed gas is formed which is open to the groove 7 from an outer surface 25 of the backing metal 2.

A nickel plated layer with a thickness of 2 to 20 μm, preferably 3 to 15 μm, is formed on that inner surface 9 of the backing metal 2 with the annular grooves 6, the groove 7, and the hole 5 formed therein which excludes the surface portions of the annular grooves 6, the groove 7, and the hole 5. A copper plated layer with a thickness of 10 to 25 μm, preferably 10 to 20 μm, is formed on the surface of the nickel plated layer. Thus two plated layers including the nickel plated layer and the copper plated layer are formed on the inner surface 9 of the backing metal 2 excluding the surface portions of the annular grooves 6, the groove 7, and the hole 5. These two plated layers constitute the bonding layer 3 between the backing metal 2 and the porous sintered metal layer 4.

A mixed powder is prepared by mixing in a mixer 4 to 10% by weight of an atomized tin powder passing through a 250-mesh sieve, 10 to 40% by weight of an electrolytic nickel powder passing through a 250-mesh sieve, 0.7 to 3.4% by weight of a copper-phosphorus (phosphorus: 14.5%) powder passing through a 120-mesh sieve, 2 to 10% by weight of particles of an inorganic substance passing through a 150-mesh sieve, and the balance consisting of an electrolytic copper powder passing through a 150-mesh sieve.

This mixed powder is packed in a die and is subjected to compression molding under compacting pressure in a range of 3 tons/cm² to 7 tons/cm², thereby fabricating a hollow cylindrical green compact.

This hollow cylindrical green compact is press-fitted onto the inner surface 9 of the hollow cylindrical backing metal 2 with the annular grooves 6, the groove 7, and the hole 5 being formed in the inner surface 9 and with the two plated layers including the nickel plated layer and the copper plated layer being formed on the inner surface 9 excluding the surface portions of the annular grooves 6, the groove 7, and the hole 5. A metallic core is inserted within the inner surface of the green compact of the hollow cylindrical backing metal 2 with the hollow cylindrical green compact press-fitted to the inner surface 9. Further, a ceramic powder is filled in the gap between the inner surface of the green compact and the outer surface of the metallic core.

The ceramic powder does not melt within the sintering temperature range, and an arbitrary ceramic powder may be used insofar as it is neutral with respect to the components of the compounded composition of the green compact, or nonreactive in a reducing atmosphere. For example, it is possible to cite graphite, carbon, alumina ($Al_2O_3$), silicon dioxide ($SiO_2$), zirconium oxide ($ZrO_2$), magnesium oxide (MgO), or complex oxides thereof. If the grain size of these ceramic powders is too small, difficulties arise in their handling, and the packing capability is inferior, so that those in the range of 35 to 200 meshes are preferable.

As the metallic core, it is possible to cite as a preferred example one which has a large coefficient of thermal expansion and is durable, e.g., one made of an austenitic stainless steel (coefficient of thermal expansion: approx. $1.5 \times 10^{-5}/°C$.). This core is capable of assuming the form of a round rod or a hollow shape. It should be noted that the outside diameter of the metallic core is preferably smaller than the inside diameter of the green compact by 10 to 30 mm or thereabouts.

Next, the assembly thus prepared is sintered in a reducing atmosphere or a vacuum at a temperature of 800 to 1,150° C., preferably 850 to 1000° C., for 20 to 120 minutes, preferably for 30 to 90 minutes. In this sintering process, the ceramic powder constrains the amount of expansion of the green compact toward the radially inward side during its sintering, as well as the amount of shrinkage of the green compact toward the radially inward side during cooling after sintering. Further, high contact pressure of the green compact with respect to the bonding layer 3 is produced by making use of the expansion of the core during sintering.

In this sintering process, nickel (Ni) and phosphorus (P) among the components produce liquid-phase $Ni_3P$, however, since the content of the phosphorus component for producing the liquid-phase $Ni_3P$ is not less than 0.1 and less than 0.5% by weight, the amount of liquid-phase $Ni_3P$ produced is small, and the liquid-phase $Ni_3P$ does not flow out. Hence, an amount of liquid-phase $Ni_3P$ necessary for bonding the porous sintered metal layer 4 to the bonding layer 3 is obtained, and exfoliation does not occur at the junctions of the backing metal 2, the porous sintered metal layer 4, and the bonding layer 3 due to the shrinkage of the porous sintered metal layer 4 along with a decline in the temperature during cooling (radiational cooling) after sintering.

In addition, since the bonding layer 3 consisting of two plated layers of the nickel plated layer and the copper plated layer is formed on the hollow cylindrical inner surface 9 of the backing metal 2, firm integration by means of the bonding layer 3 is effected between the two members of the porous sintered metal layer 4 and the backing metal 2 in the sintering process. Further, as the amount of liquid-phase $Ni_3P$ formed is reduced by decreasing the compounded quantity of the phosphorus component, the porosity of the porous sintered metal layer 4 is enhanced. Since the pressure loss in the compressed gas circulating through the porous sintered metal layer 4 thereby declines, the supply pressure of the gas spouting through the bearing surface 8 of the porous sintered metal layer 4 relatively increases, making it possible to increase the amount of flotation. Accordingly, it is possible to obtain a bearing material for the porous hydrostatic gas radial bearing 1 in which the porous sintered metal layer 4 and the backing metal 2 are firmly integrated by means of the bonding layer 3.

Thus a radial bearing material is obtained which has the porous sintered metal layer 4 sintered onto the inner surface 9 of the hollow cylindrical backing metal 2 by means of the bonding layer 3. In this radial bearing material, the bonding strength (shearing strength) between the hollow cylindrical backing metal 2 and the porous sintered metal layer 4 sintered onto the inner surface 9 of the backing metal 2 by means of the bonding layer 3 exhibits 6.5 N/mm² or more. Therefore, even if the cylindrical inner surface of the final porous sintered metal layer 4 is subjected to machining such as grinding or lapping, exfoliation or the like does not occur between the backing metal 2 and the porous sintered metal layer 4.

The cylindrical inner surface of the porous sintered metal layer 4 of the bearing material thus obtained is subjected to machining such as grinding or lapping such that its roughness becomes $10^{-3}$ mm or less, thereby obtaining a desired porous hydrostatic gas radial bearing 1 having the bearing surface 8.

Hereafter, a detailed description will be given of examples of the present invention. It should be noted that in the following comparative examples, the porous sintered metal layer 4 cannot be bonded to the backing metal 2 made of stainless steel, so that a carbon steel for machine structural use (S45C) was used as the backing metal 2 in the comparative examples.

EXAMPLE 1

The hollow cylindrical backing metal 2 made of a martensitic stainless steel [SUS 420 J 2 (B)] having an inside diameter of 30 mm, an outside diameter of 45 mm, and a length of 30 mm was prepared. Three annular grooves 6 having a width of 2 mm and a depth of 2 mm and arranged at equal intervals along the axial direction of the backing metal 2, as well as one groove 7 for allowing the annular grooves 6 to communicate with each other and extending along the axial direction of the backing metal 2, were respectively formed in the inner surface 9 of this hollow cylindrical backing metal 2. Additionally, one hole 5 which was open to the groove 7 from the outer surface 25 of the backing metal 2 was formed.

A 3 μm-thick nickel plated layer was formed on that inner surface 9 of the hollow cylindrical backing metal 2 with the annular grooves 6, the groove 7, and the hole 5 formed therein which excludes the surface portions of the annular grooves 6, the groove 7, and the hole 5. A 10 μm-thick copper plated layer was formed on the surface of the nickel plated layer. Thus two plated layers were formed.

A mixed powder (copper: 58.85 wt. %; tin: 8 wt. %; nickel: 28 wt. %; phosphorus: 0.15 wt. %; and graphite: 5 wt. %) was prepared by mixing the following components in a V-type mixer for 5 minutes: 8% by weight of an atomized tin powder passing through a 250-mesh sieve, 28% by weight of an electrolytic nickel powder passing through a 250-mesh sieve, 1.0% by weight of a copper-phosphorus (phosphorus: 14.5%) powder passing through a 120-mesh sieve, 5% by weight of a graphite powder (particles of an inorganic substance) passing through a 150-mesh sieve, and the balance consisting of an electrolytic copper powder passing through a 150-mesh sieve.

This mixed powder was packed in a die and was subjected to compression molding under compacting pressure of 3 tons/cm$^2$, thereby fabricating a hollow cylindrical green compact having an inside diameter of 26 mm, an outside diameter of 30 mm, and a length of 30 mm.

Figure 6:
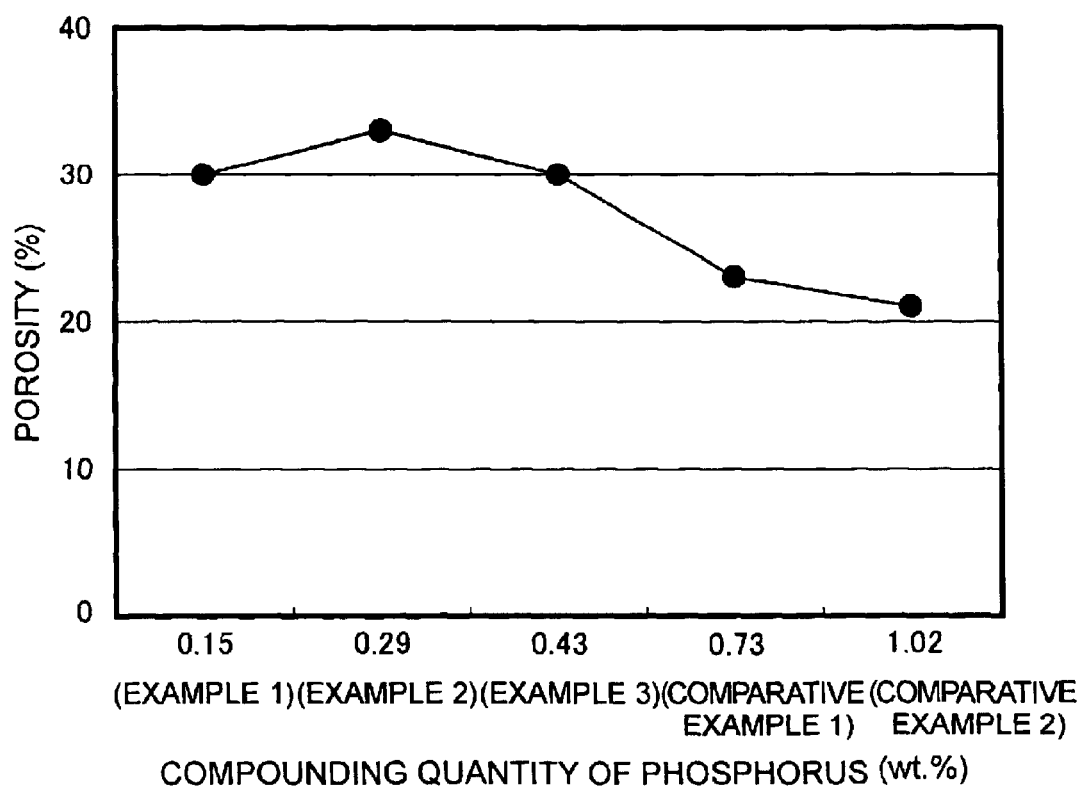
FIG. 6 is a graph illustrating the porosity of porous sintered metal layers.

This hollow cylindrical green compact was press-fitted onto the inner surface 9 of the hollow cylindrical backing metal 2. A round rod (metallic core) made of an austenitic stainless steel and having an outside diameter of 16 mm and a length of 30 mm was inserted within the inner surface of the green compact press-fitted to the inner surface 9 of the backing metal 2. Further, a ceramic powder (a mixture of Al$_2$O$_3$: 83 wt. % and SiO$_2$: 17 wt. %, 35 to 150 meshes) was filled in the gap between the inner surface of the hollow cylindrical green compact and the outer surface of the round rod. Subsequently, this assembly was sintered in an atmosphere of an ammonia decomposed gas at a temperature of 930° C. for 60 minutes. Subsequently, a bearing material for the porous hydrostatic gas radial bearing 1 was obtained in which the porous sintered metal layer 4 was integrally bonded to the inner surface 9 of the hollow cylindrical backing metal 2 by means of the bonding layer 3. The bonding strength (shearing strength) between the backing metal 2 and the porous sintered metal layer 4 integrally bonded to the inner surface 9 of the backing metal 2 in this bearing material was 6.7 N/mm$^2$. The porosity of the porous sintered metal layer 4 of this bearing material is shown in FIG. 6.

Then, the inner surface of the porous sintered metal layer 4 was subjected to grinding, thereby obtaining the porous hydrostatic gas radial bearing 1 in which a 1.7 mm-thick porous sintered metal layer 4 having the bearing surface 8 was provided on the inner surface 9 of the hollow cylindrical backing metal 2.

EXAMPLE 2

In the same way as Example 1, the hollow cylindrical backing metal 2 was prepared which was provided with the annular grooves 6, the groove 7, and the hole 5 and was provided with two plated layers including a 3 μm-thick nickel plated layer formed on the inner surface 9 excluding the surface portions of the annular grooves 6, the groove 7, and the hole 5, as well as a 15 μm-thick copper plated layer formed on the surface of the nickel plated layer.

A mixed powder (copper: 58.71 wt. %; tin: 8 wt. %; nickel: 28 wt. %; phosphorus: 0.29 wt. %; and graphite: 5 wt. %) was prepared by mixing the following components in a V-type mixer for 5 minutes: 8% by weight of an atomized tin powder passing through a 250-mesh sieve, 28% by weight of an electrolytic nickel powder passing through a 250-mesh sieve, 2.0% by weight of a copper-phosphorus (phosphorus: 14.5%) powder passing through a 120-mesh sieve, 5% by weight of a graphite powder (particles of an inorganic substance) passing through a 150-mesh sieve, and the balance consisting of an electrolytic copper powder passing through a 150-mesh sieve.

Thereafter, in a method similar to that of the above-described Example 1, a bearing material for the porous hydrostatic gas radial bearing 1 was obtained in which the porous sintered metal layer 4 was integrally bonded to the inner surface 9 of the hollow cylindrical backing metal 2 by means of the bonding layer 3. The bonding strength (shearing strength) between the backing metal 2 and the porous sintered metal layer 4 integrally bonded to the inner surface 9 of the backing metal 2 in this bearing material was 7.2 N/mm$^2$. The porosity of the porous sintered metal layer 4 of this bearing material is shown in FIG. 6.

Then, the inner surface of the porous sintered metal layer 4 was subjected to grinding, thereby obtaining the porous hydrostatic gas radial bearing 1 in which a 1.7 mm-thick porous sintered metal layer 4 having the bearing surface 8 was provided on the inner surface 9 of the hollow cylindrical backing metal 2.

EXAMPLE 3

In the same way as Example 1, the hollow cylindrical backing metal 2 was prepared which was provided with the annular grooves 6, the groove 7, and the hole 5 and was provided with the two plated layers including a 10 μm-thick nickel plated layer formed on the inner surface 9 excluding the surface portions of the annular grooves 6, the groove 7, and the hole 5, as well as a 20 μm-thick copper plated layer formed on the surface of the nickel plated layer.

A mixed powder (copper: 58.58 wt. %; tin: 8 wt. %; nickel: 28 wt. %; phosphorus: 0.42 wt. %; and graphite: 5 wt. %) was prepared by mixing the following components in a V-type mixer for 5 minutes: 8% by weight of an atomized tin powder passing through a 250-mesh sieve, 28% by weight of an electrolytic nickel powder passing through a 250-mesh sieve, 3.0% by weight of a copper-phosphorus (phosphorus: 14.5%) powder passing through a 120-mesh sieve, 5% by weight of a graphite powder (particles of an inorganic substance) passing through a 150-mesh sieve, and the balance consisting of an electrolytic copper powder passing through a 150-mesh sieve.

Thereafter, in a method similar to that of the above-described Example 1, a bearing material for the porous hydrostatic gas radial bearing 1 was obtained in which the porous sintered metal layer 4 was integrally bonded to the inner surface 9 of the hollow cylindrical backing metal 2 by means of the bonding layer 3. The bonding strength (shearing strength) between the backing metal 2 and the porous sintered metal layer 4 integrally bonded to the inner surface 9 of the backing metal 2 in this bearing material was 7.0 N/mm$^2$. The porosity of the porous sintered metal layer 4 of this bearing material is shown in FIG. 6.

Then, the inner surface of the porous sintered metal layer 4 was subjected to grinding, thereby obtaining the porous hydrostatic gas radial bearing 1 in which a 1.7 mm-thick porous sintered metal layer 4 having the bearing surface 8 was provided on the inner surface 9 of the hollow cylindrical backing metal 2.

COMPARATIVE EXAMPLE 1

The hollow cylindrical backing metal 2 made of a carbon steel for machine structural use (S45C) having an inside diameter of 30 mm, an outside diameter of 45 mm, and a length of 30 mm was prepared. Three annular grooves having a width of 2 mm and a depth of 2 mm and arranged at equal intervals along the axial direction of the backing metal, as well as one communicating groove for allowing the annular grooves to communicate with each other and extending along the axial direction of the backing metal, were respectively formed in the inner surface of this hollow cylindrical backing metal. Additionally, one supply hole which was open to the communicating groove from the outer surface of the backing metal was formed.

A mixed powder (copper: 58.42 wt. %; tin: 8 wt. %; nickel: 28 wt. %; phosphorus: 0.58 wt. %; and graphite: 5 wt. %) was prepared by mixing the following components in a V-type mixer for 5 minutes: 8% by weight of an atomized tin powder passing through a 250-mesh sieve, 28% by weight of an electrolytic nickel powder passing through a 250-mesh sieve, 4.0% by weight of a copper-phosphorus (phosphorus: 14.5%) powder passing through a 120-mesh sieve, 5% by weight of a graphite powder (particles of an inorganic substance) passing through a 150-mesh sieve, and the balance consisting of an electrolytic copper powder passing through a 150-mesh sieve.

Thereafter, in a method similar to that of the above-described Example 1, a bearing material for the porous hydrostatic gas radial bearing was obtained in which the porous sintered metal layer was integrally bonded to the inner surface of the hollow cylindrical backing metal. The porosity of the porous sintered metal layer of this bearing material is shown in FIG. 6. Then, the inner surface of the porous sintered metal layer was subjected to grinding, thereby obtaining the porous hydrostatic gas radial bearing in which a 1.7 mm-thick porous sintered metal layer having the bearing surface was provided on the inner surface of the hollow cylindrical backing metal.

COMPARATIVE EXAMPLE 2

A hollow cylindrical backing metal similar to that of the above-described Comparative Example 1 was prepared.

A mixed powder (copper: 57.98 wt. %; tin: 8 wt. %; nickel: 28 wt. %; phosphorus: 1.02 wt. %; and graphite: 5 wt. %) was prepared by mixing the following components in a V-type mixer for 5 minutes: 8% by weight of an atomized tin powder passing through a 250-mesh sieve, 28% by weight of an electrolytic nickel powder passing through a 250-mesh sieve, 7.0% by weight of a copper-phosphorus (phosphorus: 14.5%) powder passing through a 120-mesh sieve, 5% by weight of a graphite powder (particles of an inorganic substance) passing through a 150-mesh sieve, and the balance consisting of an electrolytic copper powder passing through a 150-mesh sieve.

Thereafter, in a method similar to that of the above-described Example 1, a bearing material for the porous hydrostatic gas radial bearing was obtained in which the porous sintered metal layer was integrally bonded to the inner surface of the hollow cylindrical backing metal. The porosity of the porous sintered metal layer of this bearing material is shown in FIG. 6. Then, the inner surface of the porous sintered metal layer was subjected to grinding, thereby obtaining the porous hydrostatic gas radial bearing in which a 1.7 mm-thick porous sintered metal layer having the bearing surface was provided on the inner surface of the hollow cylindrical backing metal.

The open flow rates in the air (Nl/hr) of the bearing materials and the porous hydrostatic gas radial bearings obtained in the above-described Examples 1 to 3 and Comparative Examples 1 and 2 were respectively measured, and the flow rate ratio (the open flow rate of the porous hydrostatic gas radial bearing/the open flow rate of the bearing material) was investigated. As for the method of measuring the open flow rate, compressed air with supply pressure of 5 kg/cm$^2$ was introduced from the supply hole in each bearing material and each porous hydrostatic gas radial bearing, and the flow rate (Nl/hr) per hour of the compressed air circulating through the porous sintered metal layer was measured.

Figure 7:
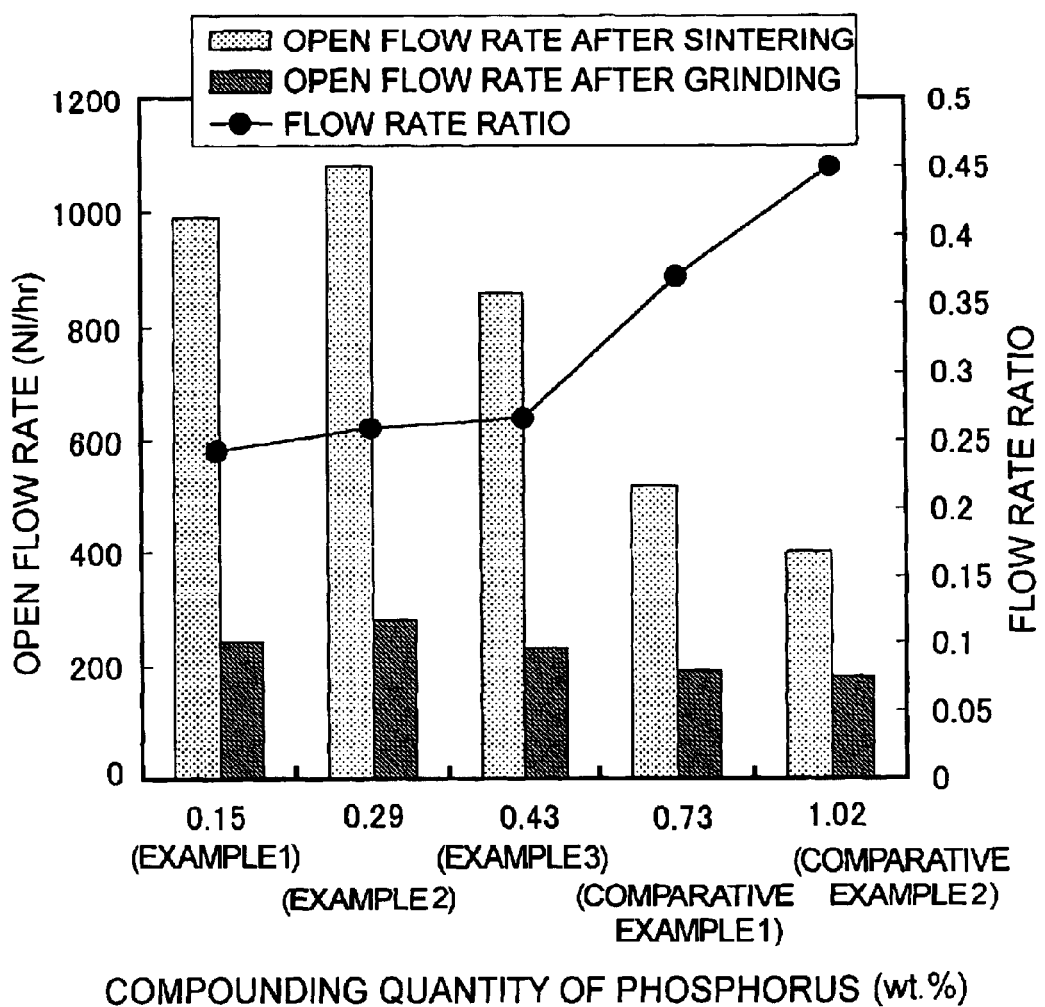
FIG. 7 is a graph illustrating open flow rates of the porous hydrostatic gas radial bearings and bearing materials as well as their flow rate ratios.

FIG. 7 is a graph illustrating the open flow rates of the porous hydrostatic gas radial bearings and the bearing materials obtained in Examples 1 to 3 and Comparative Examples 1 and 2, as well as their flow rate ratios (the open flow rate of the porous hydrostatic gas radial bearing/the open flow rate ratio of the bearing material). It can be appreciated from this graph that the flow rate ratio increases with 0.5 wt. % serving as a boundary in terms of the compounding quantity of the phosphorus component among the components for forming the porous sintered metal layer.

Next, with respect to the porous hydrostatic gas radial bearings in Examples 1 to 3 and Comparative Examples 1 and 2 which showed the aforementioned flow rate ratios, compressed air with supply pressure of 5 kg/cm$^2$ was introduced through the supply hole, and the amount of flotation ($\mu$m) of the shaft inserted within the bearing surface of each radial bearing by the compressed air circulating through the porous sintered metal layer was investigated.

Figure 8:
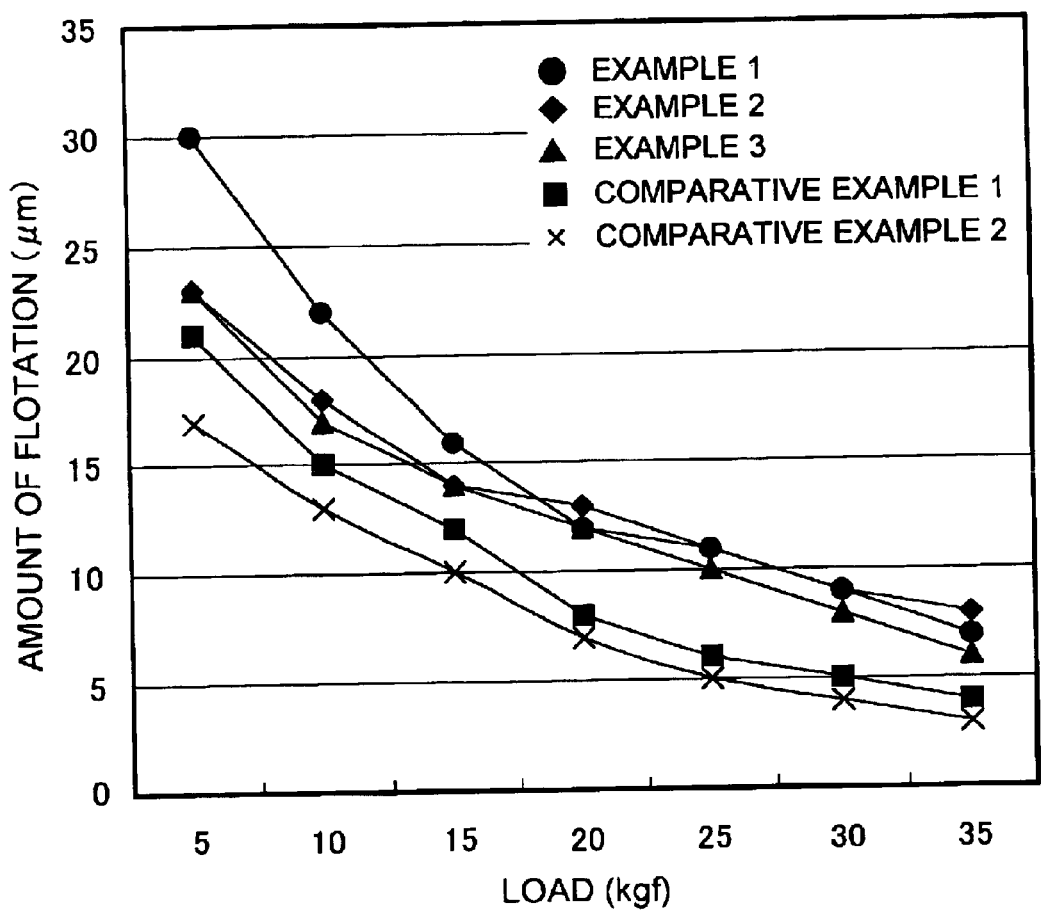
FIG. 8 is a graph illustrating the relationship between the load (kgf) and the amount of flotation ($\mu$m) in the porous hydrostatic gas radial bearings.
Figure 9:
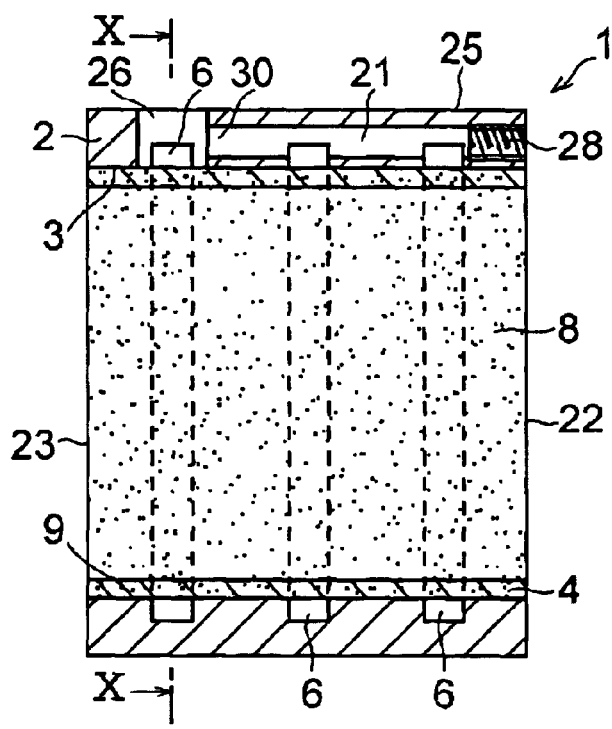
FIG. 9 is a cross-sectional view taken along line IX—IX shown in FIG. 10 and illustrates another example of the porous hydrostatic gas radial bearing in accordance with the invention.
Figure 10:
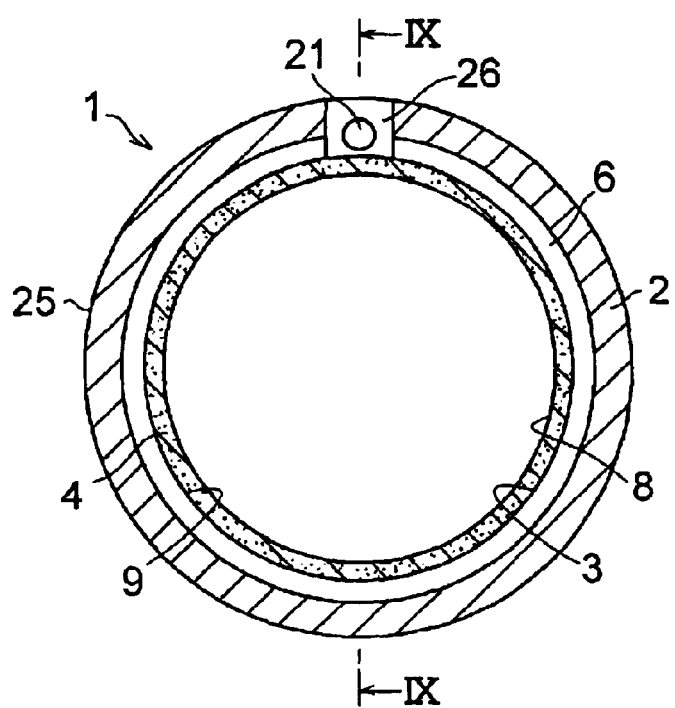
FIG. 10 is a cross-sectional view taken along line X—X shown in FIG. 9.
Figure 11:
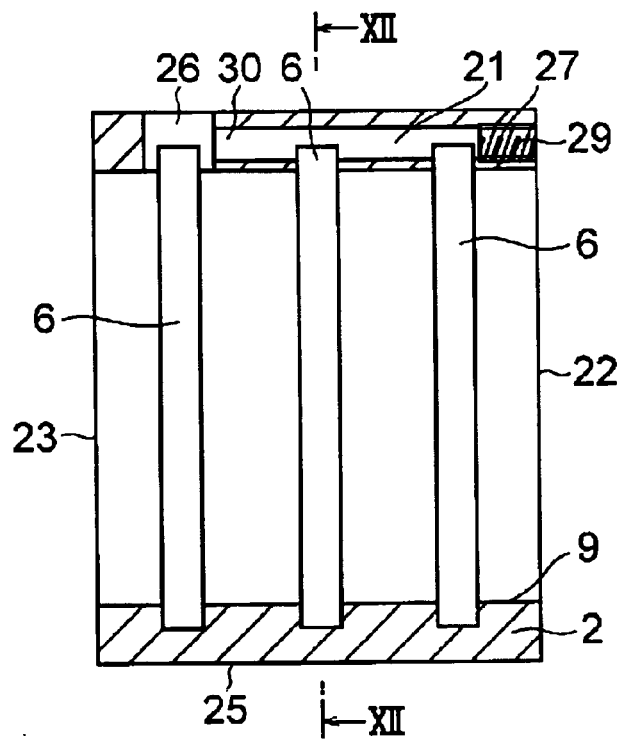
FIG. 11 is a cross-sectional view taken along line XI—XI shown in FIG. 12 and illustrates the radial bearing material of the example shown in FIG. 9.
Figure 12:
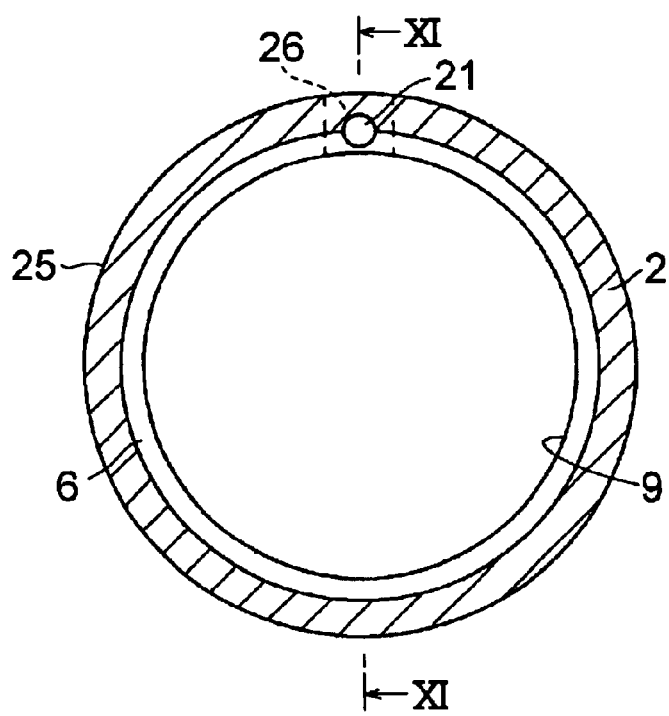
FIG. 12 is a cross-sectional view taken along line XII—XII shown in FIG. 11.

FIG. 8 is a graph illustrating the relationship between the load (kgf) and the amount of flotation in the porous hydrostatic gas radial bearings in Examples 1 to 3 and Comparative Examples 1 and 2. It can be appreciated from this graph that in the porous hydrostatic gas radial bearings 1 in Examples 1 to 3 the amount of flotation is large with respect to their load as compared to the porous hydrostatic gas radial bearings in Comparative Examples 1 and 2.

From the results of FIG. 8, it can be conjectured that the reason that the amount of flotation is greater for the porous hydrostatic gas radial bearings 1 in Examples 1 to 3 than Comparative Examples 1 and 2 although the open flow rates of the porous hydrostatic gas radial bearings 1 in Examples 1 to 3 and Comparative Examples 1 and 2 are substantially the same (see FIG. 7) is attributable to the quantities in the porosity of the bearing materials in the respective Examples and Comparative Examples (see FIG. 6). Namely, the porosity of the porous sintered metal layer 4 in the bearing material in each Example exceeds 30%, and the compressed gas introduced through the hole 5 experiences a small pressure loss at the time of circulating through the interior of the porous sintered metal layer 4. Therefore, it can be conjectured that the supply pressure of the air spouting to the bearing surface 8 relatively increases, and that the spouting of the supply air to the bearing surface 8 takes place all over the surface of the porous sintered metal layer 4, thereby increasing the amount of flotation. In contrast, the porosity of the porous sintered metal layer 4 in the bearing material in each Comparative Example is 21 to 22%. Therefore, it can be conjectured that the spouting of the supply air to the bearing surface occurs in a greater quantity in the communicating groove portion, and the spouting of the supply air from the other portions of the porous sintered metal layer is extremely small, so that the air supply to the bearing surface is unbalanced.

In the porous hydrostatic gas radial bearing 1 shown in FIGS. 1 and 2, the groove 7 for mutual communication is provided in the backing metal 2 in such a manner as to be open on the inner surface 9 side. Alternatively, as shown in FIGS. 9 to 12, a dead-end hole 21 may be provided inside the backing metal 2 in such a manner as to extend in the axial direction of the backing metal 2 from an axial annular end face 22 of the backing metal 2 toward the other annular end face 23, to allow the annular grooves 6 to communicate with each other. Also with the porous hydrostatic gas radial bearing 1 having such a dead-end hole 21 for mutual communication, the porous sintered metal layer 4 covers the openings of the respective annular grooves 6 on the inner surface 9 side of the backing metal 2, and is integrated with the cylindrical inner surface 9 of the backing metal 2 by means of the bonding layer 3, the cylindrical inner surface of the porous sintered metal layer 4 serving as the bearing surface 8.

The porous hydrostatic gas radial bearing 1 shown in FIGS. 9 to 12 further includes a dead-end hole 26 for supplying a compressed gas provided inside the backing metal 2 in such a manner as to be open at the cylindrical outer surface 25 in the radial direction of the backing metal 2 and extending radially from the outer surface 25 of the backing metal 2 toward the dead-end hole 21 for mutual communication, so as to constitute the compressed-gas supplying means together with the dead-end hole 21 and the annular grooves 6.

An axial end 27 of the dead-end hole 21 which is open at the end face 22 of the backing metal 2 has a thread groove 29 as a fitting means for fitting a plug 28. The other axial end 30 of the dead-end hole 21 is closed by the backing metal 2 itself short of the end face 23 of the backing metal 2, and is communicated with the dead-end hole 26. The plug 28 fitted to the one end 27 by being threadedly secured in the thread groove 29 closes the one end 27. The dead-end hole 26 communicates with the dead-end hole 21 and the annular grooves 6.

According to the radial bearing material for the porous hydrostatic gas radial bearing 1 shown in FIGS. 9 to 12, it is possible to obtain advantages similar to those of the above-described radial bearing materials. Additionally, since the dead-end hole 21 for mutual communication for allowing the annular grooves 6 to communicate with each other is provided inside the backing metal 2 so as not to be open on the inner surface 9 side of the backing metal 2, it is possible to avoid the supply of the compressed gas directly from the dead-end hole 21 to the porous sintered metal layer 4 through the inner surface 9 of the backing metal 2. Thus the compressed gas supplied to the dead-end hole 21 can be supplied to the porous sintered metal layer 4 through the respective annular grooves 6. Consequently, the compressed gas can be made to spout substantially uniformly from the surface of the porous sintered metal layer 4, i.e., from the bearing surface 8. Moreover, since the dead-end hole 21 for mutual communication is provided inside the backing metal 2, such a dead-end hole 21 can be easily formed in the end face 22 of the backing metal 2 by using a drill or the like, so that the fabrication efficiency extremely excels in comparison with the formation of the groove 7 for mutual communication in the inner surface 9.

Figure 13:
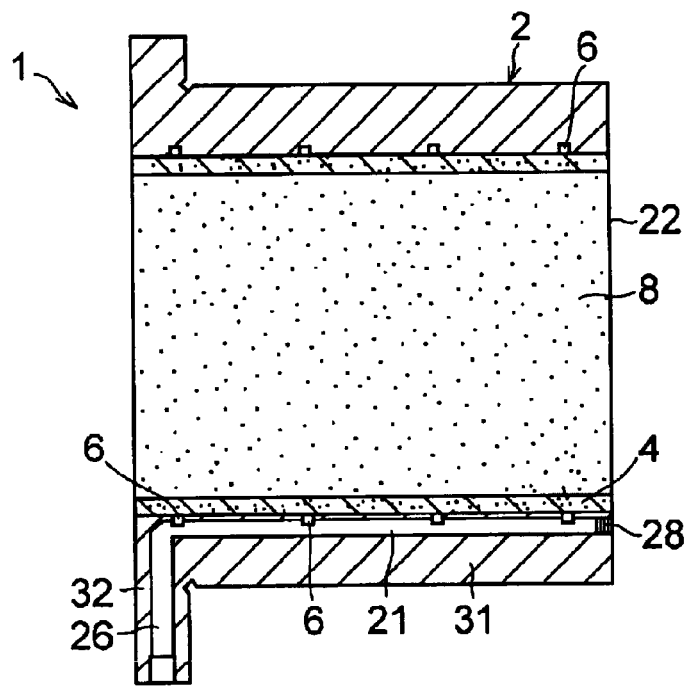
FIG. 13 is a cross-sectional view taken along line XIII—XIII shown in FIG. 14 and illustrates still another example of the porous hydrostatic gas radial bearing in accordance with the invention.
Figure 14:
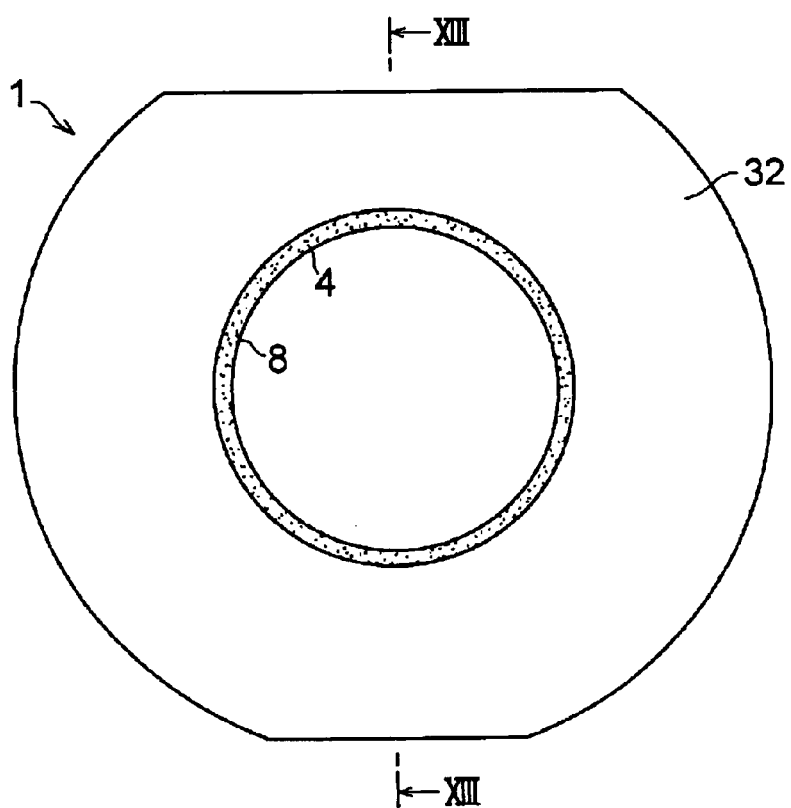
FIG. 14 is a left side-elevational view of the example shown in FIG. 13.

In addition, in the radial bearing material for the porous hydrostatic gas radial bearing 1 shown in FIGS. 9 to 12, the backing metal 2 may be formed by a hollow cylindrical portion 31 and a collar portion 32 formed integrally with the hollow cylindrical portion 31, and the dead-end hole 26 for supplying a compressed gas may be provided in the collar portion 32, thereby forming a radial bearing material with a collar, as shown in FIGS. 13 and 14. In the radial bearing material for the porous hydrostatic gas radial bearing 1 shown in FIGS. 13 and 14, in the same way as the one shown in FIGS. 9 to 12, the compressed gas can be made to spout substantially uniformly from the surface of the porous sintered metal layer 4, i.e., from the bearing surface 8. Moreover, the dead-end hole 21 can be easily formed in the end face 22 of hollow cylindrical portion 31 of the backing metal 2 by using a drill or the like, so that the fabrication efficiency extremely excels. Further, firm bonding and integration can be effected without the occurrence of exfoliation or the like between the porous sintered metal layer 4 and the backing metal 2 made of stainless steel, and the amount of flotation by the compressed gas circulating through the porous sintered metal layer 4 can be increased by enhancing the porosity of the porous sintered metal layer 4.

According to the present invention, since the porous sintered metal layer undergoes a small amount of shrinkage after sintering, the porous sintered metal layer can be firmly integrated with the stainless steel-made backing metal by means of the bonding layer. In addition, since the porosity of the porous sintered metal layer is enhanced, the pressure loss of the compressed gas circulating through the porous sintered metal layer declines. As a result, the supply pressure of the gas spouting to the surface (bearing surface) of the porous sintered metal layer relatively increases, making it possible to increase the amount of flotation.

In addition, according to the present invention, it is possible to provide a bearing material for a porous hydrostatic gas radial bearing which makes it possible to minimize unevenness in the spouting of a compressed gas from the surface of the porous sintered metal layer and excels in the manufacturing efficiency, as well as a porous hydrostatic gas radial bearing using the same.

What is claimed is:

1. A bearing material for a porous hydrostatic gas bearing comprising:

a backing metal made of stainless steel; and a porous sintered metal layer integrated with at least one surface of said backing metal by means of a bonding layer, particles of an inorganic substance being contained in a dispersed manner at grain boundaries of said porous sintered metal layer, the porous sintered metal layer which contains the particles of the inorganic substance being composed of 4 to 10% by weight of tin, 10 to 40% by weight of nickel, not less than 0.1 and less than 0.5% by weight of phosphorus, and the balance consisting of copper.

2. The bearing material for a porous hydrostatic gas bearing according to claim 1, wherein the particles of the inorganic substance are contained in said porous sintered metal layer at a rate of 2 to 10% by weight.

3. The bearing material for a porous hydrostatic gas bearing according to claim 1, wherein the particles of the inorganic substance are those of at least one of graphite, boron nitride, graphite fluoride, calcium fluoride, aluminum oxide, silicon oxide, and silicon carbide.

4. The bearing material for a porous hydrostatic gas bearing according to claim 1, wherein said backing metal is formed into a hollow cylindrical shape, and said porous sintered metal layer containing the particles of the inorganic substance in a dispersed manner is integrated on one cylindrical surface of said backing metal by means of said bonding layer.

5. The bearing material for a porous hydrostatic gas bearing according to claim 1, wherein said backing metal is formed into a planar shape, and said porous sintered metal layer containing the particles of the inorganic substance in a dispersed manner is integrated on one planar surface of said backing metal by means of said bonding layer.

6. The bearing material for a porous hydrostatic gas bearing according to claim 1, wherein said bonding layer includes at least a nickel plated layer, and the nickel plated layer is bonded to at least one surface of said backing metal.

7. The bearing material for a porous hydrostatic gas bearing according to claim 6, wherein the nickel plated layer has a thickness of not less than 3 $\mu$m and not more than 15 $\mu$m.

8. The bearing material for a porous hydrostatic gas bearing according to claim 6, wherein the nickel plated layer has a thickness of not less than 2 $\mu$m and not more than 20 $\mu$m.

9. The bearing material for a porous hydrostatic gas bearing according to claim 1, wherein said bonding layer is comprised of two plated layers including a nickel plated layer and a copper plated layer, the nickel plated layer being bonded to at least the one surface of said backing metal, the copper plated layer being bonded to the nickel plated layer.

10. The bearing material for a porous hydrostatic gas bearing according to claim 9, wherein the copper plated layer has a thickness of not less than 10 μm and not more than 20 μm.

11. The bearing material for a porous hydrostatic gas bearing according to claim 9, wherein the copper plated layer is bonded to an obverse surface of the nickel plated layer.

12. The bearing material for a porous hydrostatic gas bearing according to claim 9, wherein the copper plated layer has a thickness of not less than 10 μm and not more than 25 μm.

13. A porous hydrostatic gas bearing using said bearing material according to claim 1, wherein said backing metal is provided with means for supplying a compressed gas to said porous sintered metal layer containing the particles of the inorganic substance in a dispersed manner.

14. A bearing material for a porous hydrostatic gas radial bearing comprising:
 a backing metal made of stainless steel and having a cylindrical inner surface;
 a plurality of annular groove portions which are provided in the inner surface of said backing metal in such a manner as to be juxtaposed in an axial direction and to be open on an inner surface side;
 a dead-end hole portion for mutual communication provided inside said backing metal in such a manner as to extend in an axial direction of said backing metal from one annular end face of said backing metal toward another annular end face thereof, to allow the annular grooves to communicate with each other; and
 a hollow cylindrical porous sintered metal layer for covering openings of each of the annular groove portions on the inner surface side of said backing metal, and integrated with the cylindrical inner surface of said backing metal by means of a bonding layer.

15. The bearing material for a porous hydrostatic gas radial bearing according to claim 14, wherein one end of said dead-end hole portion for mutual communication is open at an annular end face of said backing metal, and another end of said dead-end bole portion for mutual communication is closed by said backing metal itself short of another annular end face of said backing metal.

16. The bearing material for a porous hydrostatic gas radial bearing according to claim 15, further comprising fitting means for fitting a plug for closing the one end of said dead-end hole portion for mutual communication.

17. The bearing material for a porous hydrostatic gas radial bearing according to claim 16, wherein said fitting means has a thread groove.

18. The bearing material for a porous hydrostatic gas radial bearing according to claim 14, further comprising a dead-end hole portion for supplying a compressed gas provided inside said backing metal in such a manner as to be open at an outer surface of said backing metal and extending radially from the outer surface of said backing metal toward said dead-end hole portion for mutual communication.

19. The bearing material for a porous hydrostatic gas radial bearing according to claim 14, wherein said porous sintered metal layer includes grain boundaries of a sintered metal containing tin, nickel, phosphorus, and copper, and particles of an inorganic substance dispersed at the grain boundaries of the sintered metal.

20. The bearing material for a porous hydrostatic gas radial bearing according to claim 19, wherein 4 to 10% by weight of tin, 10 to 40% by weight of nickel, not less than 0.1 and less than 0.5% by weight of phosphorus, and the balance including copper are contained at grain boundaries of the sintered metal.

21. The bearing material for a porous hydrostatic gas radial bearing according to claim 19, wherein the particles of the inorganic substance are contained at a rate of 2 to 10% by weight.

22. The bearing material for a porous hydrostatic gas radial bearing according to claim 19, wherein the particles of the inorganic substance are those of at least one of graphite, boron nitride, graphite fluoride, calcium fluoride, aluminum oxide, silicon oxide, and silicon carbide.

23. The bearing material for a porous hydrostatic gas radial bearing according to claim 14, wherein said bonding layer includes at least a nickel plated layer, and the nickel plated layer is bonded to the cylindrical inner surface of said backing metal.

24. The bearing material for a porous hydrostatic gas radial bearing according to claim 23, wherein the nickel plated layer has a thickness of not less than 2 μm and not more than 20 μm.

25. The bearing material for a porous hydrostatic gas radial bearing according to claim 23, wherein the nickel plated layer has a thickness of not less than 3 μm and not more than 15 μm.

26. The bearing material for a porous hydrostatic gas radial bearing according to claim 14, wherein said bonding layer is comprised of two plated layers including a nickel plated layer and a copper plated layer formed on an obverse surface of the nickel plated layer, the nickel plated layer being bonded to the cylindrical inner surface of said backing metal, the copper plated layer being bonded to the nickel plated layer.

27. The bearing material for a porous hydrostatic gas radial bearing according to claim 26, herein the copper plated layer has a thickness of not less than 10 μm and not more than 25 μm.

28. The bearing material for a porous hydrostatic gas radial bearing according to claim 26, wherein the copper plated layer has a thickness of not less than 10 μm and not more than 20 μm.

29. A porous hydrostatic gas radial bearing using said bearing material according to claim 14.

30. The porous hydrostatic gas radial bearing according to claim 29, wherein a plug for closing one end of said dead-end hole portion for mutual communication is fitted in the one end thereof.

* * * * *